March 16, 1937. J. H. McFAUL 2,073,942
APPARATUS FOR MAKING MULTIPLEX FASTENERS OR NAILS
Filed May 1, 1936 10 Sheets-Sheet 2

March 16, 1937. J. H. McFAUL 2,073,942
APPARATUS FOR MAKING MULTIPLEX FASTENERS OR NAILS
Filed May 1, 1936  10 Sheets-Sheet 8

INVENTOR
Joseph H. McFaul.
BY Chas. McC. Chapman
ATTORNEY

March 16, 1937.  J. H. McFAUL  2,073,942
APPARATUS FOR MAKING MULTIPLEX FASTENERS OR NAILS
Filed May 1, 1936   10 Sheets-Sheet 9

INVENTOR
Joseph H. McFaul.
BY Chas. M. C. Chapman
ATTORNEY

Patented Mar. 16, 1937

2,073,942

UNITED STATES PATENT OFFICE 2,073,942

APPARATUS FOR MAKING MULTIPLEX FASTENERS OR NAILS

Joseph H. McFaul, Chicago, Ill., assignor to The Gerrard Company, Inc., a corporation of Delaware Application May 1, 1936, Serial No. 77,343

26 Claims. (Cl. 10—28)

This invention relates to the art of fabricating corrugated nails or fasteners from sheet material and has particular reference to a machine or apparatus by which a multiplex nail or fastener strip may be fabricated automatically from a continuous strip of flat material which, in turn, is made to produce a plurality of nails or fastener strips from which the individual nails or fasteners, of any predetermined size or length, can be cut without reference to any particular line of transverse demarkation.

Throughout this specification the terms "fastener" and "nail" will be used with the same meaning, the same being known in this art as equivalents.

In the manufacture of nail-strips under the present practice a strip of sheet metal, of a width equal to substantially the length of the finished nail, is run through a pair of corrugating rollers and thence into a set of dies where one of its edges is suitably swaged, cut, or ground on both sides to form penetrating points for the finished nail. The dies used on these machines are quite expensive, not only in their initial cost, but in their upkeep, as they must have constant attention to keep them in proper shape to make a usable product. And, such machines, obviously, are limited in their production as they are only capable of handling a single nail strip.

In accordance with the present invention a machine is provided from which complicated and expensive dies are eliminated, thus effecting considerable economy in the cost thereof, and in its maintenance.

Among the objects of my invention may be noted the following: to provide a machine for manufacturing a multiplex nail-strip and separating it into individual nail-strips, all steps and operations being automatic; to provide such a machine in which the production may be greatly increased and the product of which needs no further treatment to complete it for use; to provide a machine of the character noted in which the individual nail-strips are made of different widths; to provide a machine for making nail-strips having such characteristics that the nails cut therefrom will have qualities superior to those at present known, and will be easier to drive and less liable to be distorted while being driven; to provide a machine in which a single sheet of flat material, of predetermined width and indefinite length, is treated in successive stages so as to produce a multiplex basic nail-strip and then a plurality of individual nail-strips all having predetermined characteristics of the finished nails which are to be severed from the individual strips; to provide a machine which will operate to produce a plurality of nail-strips of varying sizes having all the features of the finished nails of different sizes to be severed therefrom so that said nails do not require grinding, sharpening, burring or other finishing operations; to provide a machine such as noted capable of producing a uniform nail or fastener strip from which the nails can be cut arbitrarily and still have their essential characteristics invariable.

With the above objects in view and others which will be detailed during the course of this description, my invention consists in the parts, features, elements and combinations thereof which will be hereinafter described and claimed.

In order that my invention may be clearly understood I have provided drawings in which.

It should be understood that my machine is intended to operate on a continuous strip of sheet material, such as iron, steel, copper, brass or any other metal from which it is desired to fabricate nails or fasteners of varying lengths or sizes and which is to be made into nail-strips which may vary in width to any desired extent. The basic strip is of indefinite length; but, of predetermined width, and the individual nail-strip will be made to vary in width according to the size of nails desired and the number to be fabricated from the basic strip in a single run of the latter. Thus, in a single run of the basic strip, both the size of the nails and the number to be obtained will depend upon the set-up of the machine, which can be varied by the substitution of different sizes of its constituent parts.

Referring to the drawings the reference numeral 1 designates the base or frame on which the machine is mounted. The station or unit at which the flat strip enters the machine and is perforated, is indicated by the numeral 2; and 3 denotes the station or unit of the machine where the corrugating, shearing and scoring functions are performed.

Figure 19:
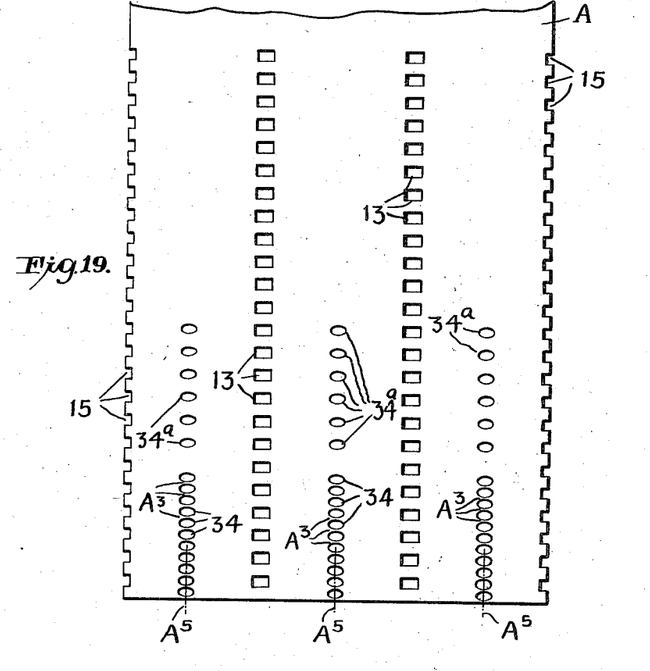
Figure 19 is a plan view of the basic strip after being punched and prior to being corrugated.

The flat strip of basic material A, shown in plan in Figure 19, preferably comes on a reel as shown at 4. This reel is mounted on a spindle 5 suitably supported on a frame 6. The spindle 5 may be tight in its bearings or means of any conventional form may be supplied to prevent overrunning of the strip or unwinding of the reel.

Punching mechanism

The mechanism generally referred to as unit 2, largely comprises a known form of punch-press and a detailed description and illustration is therefore unnecessary. Thereof the plunger 7 is mounted in the usual eccentric manner and the conventional driving pulley 8 and belt 9 are provided. The main driving shaft has an extension 10 on which a bevel gear 11 is secured, which in turn drives other mechanism hereinafter described. However, considerable novelty resides in the arrangement of the punches and dies. As the sheet A is passing through the machine it first encounters two parallel rows of punches 12, Figure 4, which form the lines of guiding perforations 13, Figure 19. Simultaneously it encounters punches 14 which form the side notches 15 on the edges of the strip. These punches are all preferably rectangular in cross section, and the advance or pilot punches 16 thereof are provided to aid in preventing any inaccuracies.

The punches 12 and 14 are secured to the plate 17 in the conventional manner and said plate forms part of the casting 18 which has guiding pins 19 cooperating with apertures in the bed plate 20 to prevent turning movement of the punches. The bed plate 20 is secured to the frame 1 by bolts 20a at opposite ends. The plate 17 and casting 18 are secured to the frame of the punch press by bolts 21 and 22 cooperating with suitable lugs.

Figure 17:
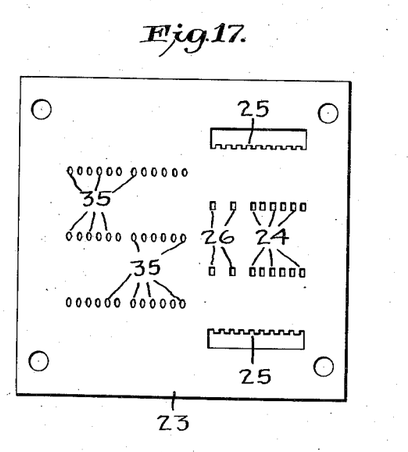
Figure 17 is a detail plan view of the female die.

The die 23, Figure 17 has openings 24 to cooperate with the punches 12 and other openings 25 to cooperate with the punches 14. The openings 26 accommodate the pilot punches 16. The die is suitably secured to the bed plate 20, and a stripper plate 27 acts to prevent the strip A being pulled upward as the punches are being raised. The numeral 28 designates a hardened steel plate in which rectangular openings are formed and acts to prevent wear on the stripper plate as the punches are being withdrawn.

Figure 3:
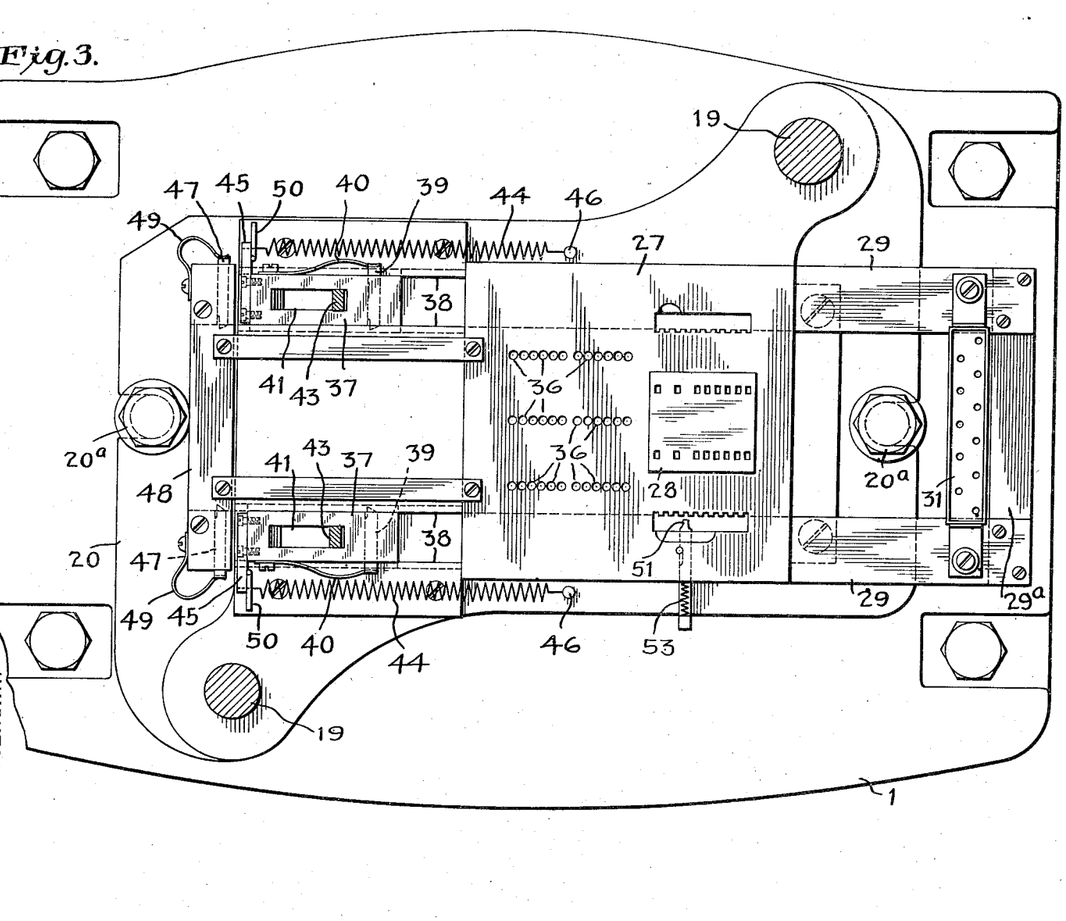
Figure 3 is a plan view enlarged, showing the die, stripper plate and initial means for advancing the strip.

The strip A, prior to entering the punch press, passes between two extensions 29 into the opening 30 (Fig. 4) between the stripper plate and the die. The two extensions 29 are connected at their outer ends by a cross-bar 29a on which the strip rests prior to entering the mouth of the opening 30. Oiling means 31 of any desired character are provided to lubricate both sides of the basic strip thereby assisting the strip to pass through the machine and facilitating the action of the punches and die. The extensions 29 are coextensive with the punch press and are accurately positioned to prevent any lateral movement whatever of the strip while being perforated. As the strip continues its progress through the punch press and after the guiding perforations 13 and notches 15 are formed, it encounters a plurality of rows of punches which are preferably arranged in groups 32 and 33. These punches are elliptical in cross section and form the lines of perforations 34 shown in Figures 19 and 20. The major axis of these elliptical perforations runs transversely of the strip of material. The first groups 32 of elliptical punches produce alternate or widely spaced holes as shown at 34a in Figure 19. When the second groups 33 are reached they produce the between holes. In this manner the elliptical perforations 34 are punched closely adjacent each other leaving only a very narrow separating web. The purpose of this mode of operation will be presently described. It will be noted that the central line of perforations 34 is disposed between the lines of guiding perforations 13, and the other lines of perforations are disposed between the lines of guiding perforations 13 and the notched edges of the strip. The spacing of all the apertures may be widely varied by changing the punches and dies; but, it is desirable to maintain the alternate disposition of the lines of elliptical perforations and guiding perforations. The die cooperating with the elliptical punches may be formed integral with the die 23, or suitably secured thereto, and in Figure 17 the elliptical openings 35, cooperating with the punches, are shown. The stripper plate 27, as illustrated in Figure 3, also extends over this part of the die and has a plurality of openings 36 to accommodate the punches.

Initial advancing means

Figure 5:
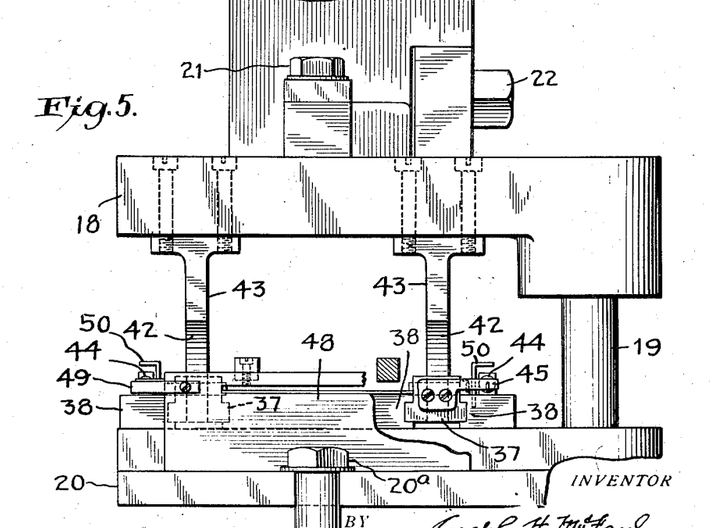
Figure 5 is a similar view looking from the left of Figure 2.

The means will now be described for advancing the strip of material through the punch press during the automatic operation of the machine. It is for this purpose that the notches 15 along the edges of the strip are formed. The strip advancing means is particularly illustrated in Figures 2, 3 and 5. A pair of slides 37 is mounted in guides 38 secured to the frame of the machine. These slides carry plungers 39 which are pressed inwardly by springs 40 to normally engage the notches 15 of the basic strip. The slides 37 have openings 41 which are engaged by the cam surfaces 42 (see Figure 2) of members 43 depending from the reciprocating punch-head 18. As the ram of the punch press descends the cam surfaces 42 move the slides 37 toward the left in Figures 2 and 3, and plungers 39 engaged with the notches 15 draw the strip of material A along. From an inspection of the drawings it will be apparent that the slides will complete their movement before the punches enter the strip of material and the depending members 43 will hold the slides stationary while the strip is being perforated. As the ram rises springs 44, secured at one end to a projection 45 on the slides and at the other end to pins 46 on the frame I of the machine, will retract the slides. At this time the plungers 39 will trip past the notches 15 of the basic strip. To prevent any possibility of the strip A being drawn in the reverse direction when the slides 37 are being retracted, other plungers 47 are mounted in a fixed horizontal bar 48 secured to the machine frame. These plungers are normally pressed inwardly to engage the notches 15 by springs 49. When the strip is being advanced the plungers 47 will trip past the notches 15. After the strip has been advanced the required amount by the slides 37 and plungers 39 and the slides 37 are being moved back the plungers 47 will engage the notches 15 and positively prevent any backward movement of the strip.

In starting a strip of material through the machine it is desirable to prevent the automatic initial advancing mechanism from operating. For this purpose pins 50 are removably mounted in openings in a fixed part of the machine and said pins engage the projectors 45 on the slides 37 to hold the slides in their advanced positions so they will not be moved by the cams 42. The parts are shown in this position in Figures 2 and 3.

Figure 1:
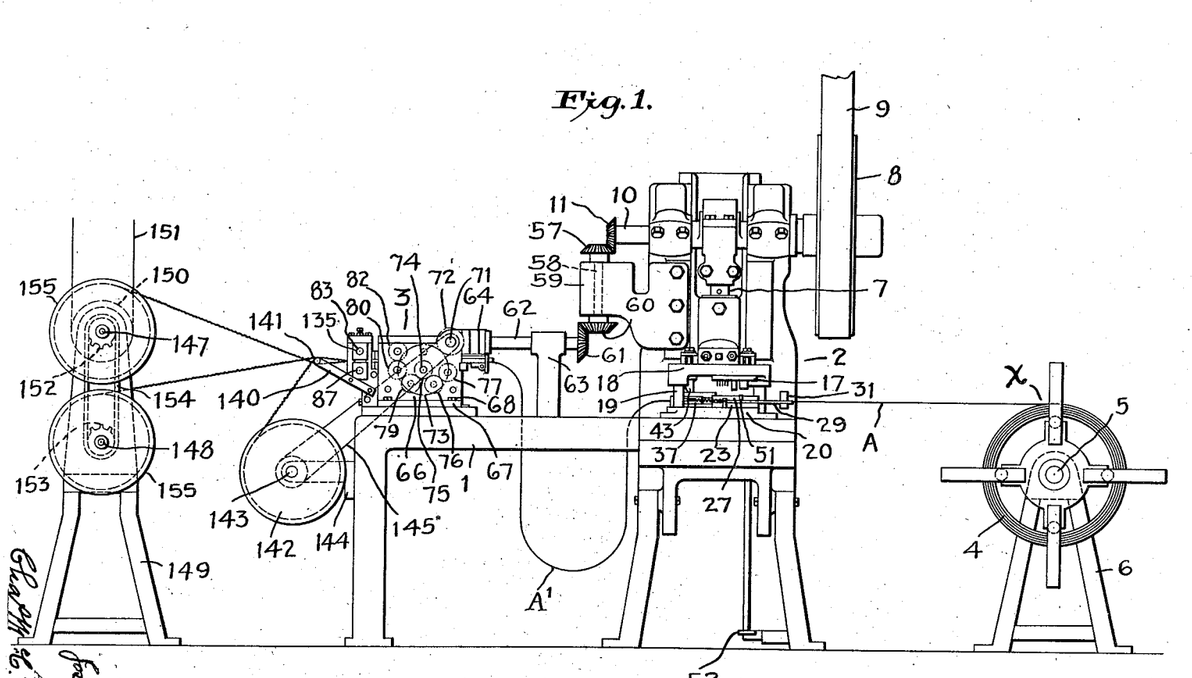
Figure 1 is a view, in front elevation, showing a machine or apparatus embodying my invention.
Figure 2:
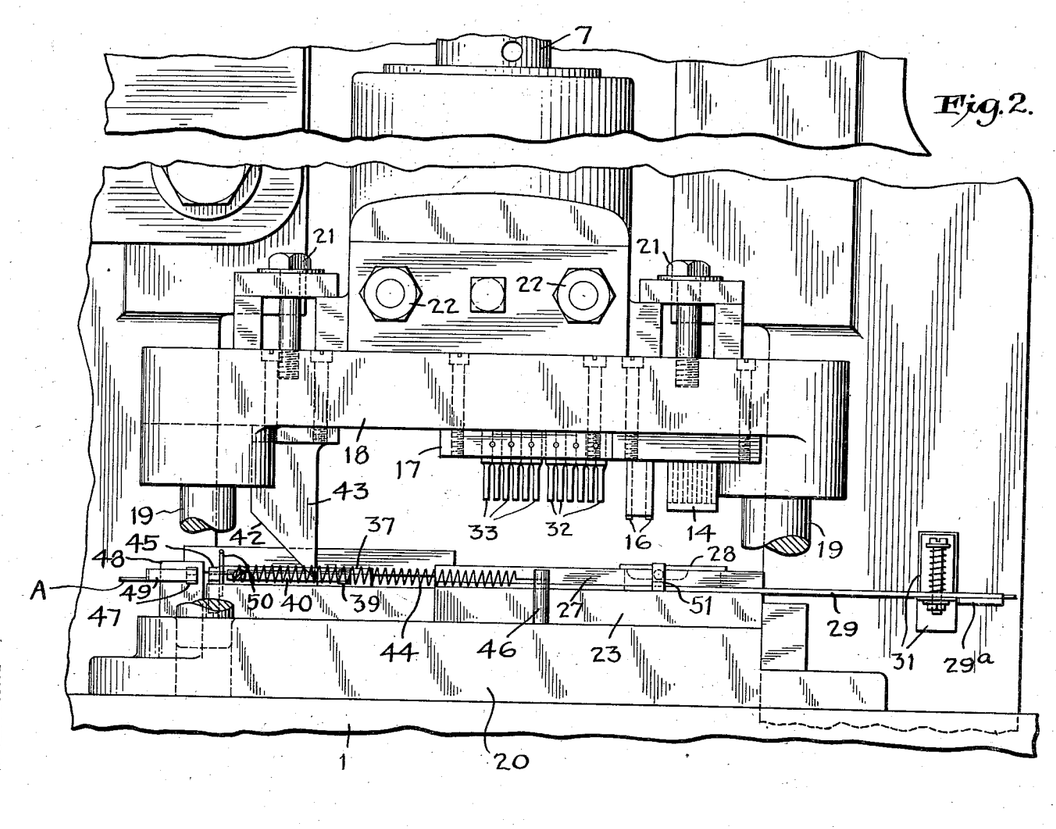
Figure 2 is a view, in front elevation and enlarged, of a portion of the machine showing the die members and initial advancing mechanism, parts being broken away due to the limitations of the sheet.
Figure 4:
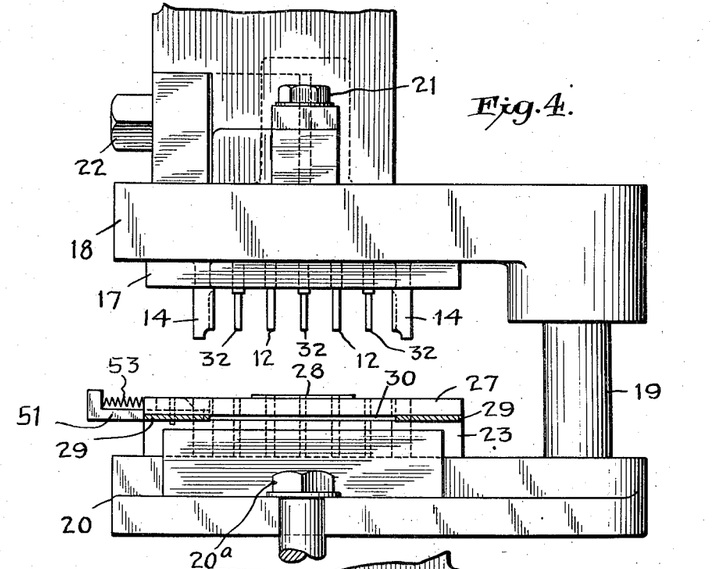
Figure 4 is an end elevational view looking from the right of Figure 2.

The basic strip is first fed into the machine by hand until the end abuts a normally retracted plunger 51, Figures 2, 3 and 4, which is manually pressed inwardly. The punches are then brought down by operating the treadle 52, Figure 1, and that part of the sheet is perforated by the punches 12 and 14. The strip is again advanced by hand and the plunger 51 is again pushed inwardly to engage the last one of the notches 15 formed by the first operation. A spring 53 normally holds the plunger 51 out of engagement with the notches 15. The punches are again dropped and this operation is continued until the entering end of the strip has passed beyond the automatic feeding means. The punch press is then operated by power transmitted by the driving belt 9 until a sufficient amount of the strip has been perforated to form the loop A1, Figure 1. The end of the strip is then entered into the mechanism, or unit, indicated by 3.

Corrugating, shearing and scoring

Figure 7:
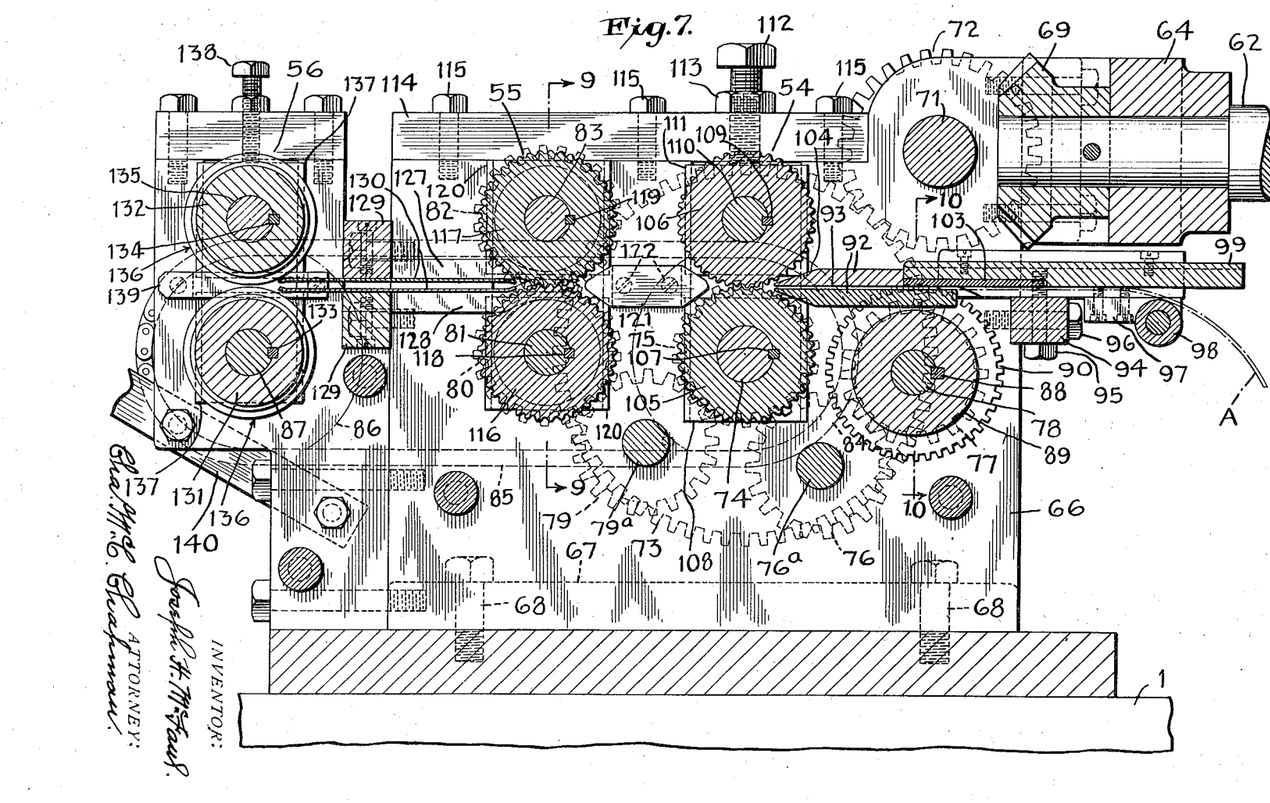
Figure 7 is a longitudinal sectional view taken on the line 7—7 of Figure 6, looking in the direction of the arrows.

This third unit comprises generally, as shown in Figure 7, corrugating means 54, shearing means 55 and scoring means 56. The means for performing these various operations are positively driven from a power take off from the punch press, heretofore described.

Figure 6:
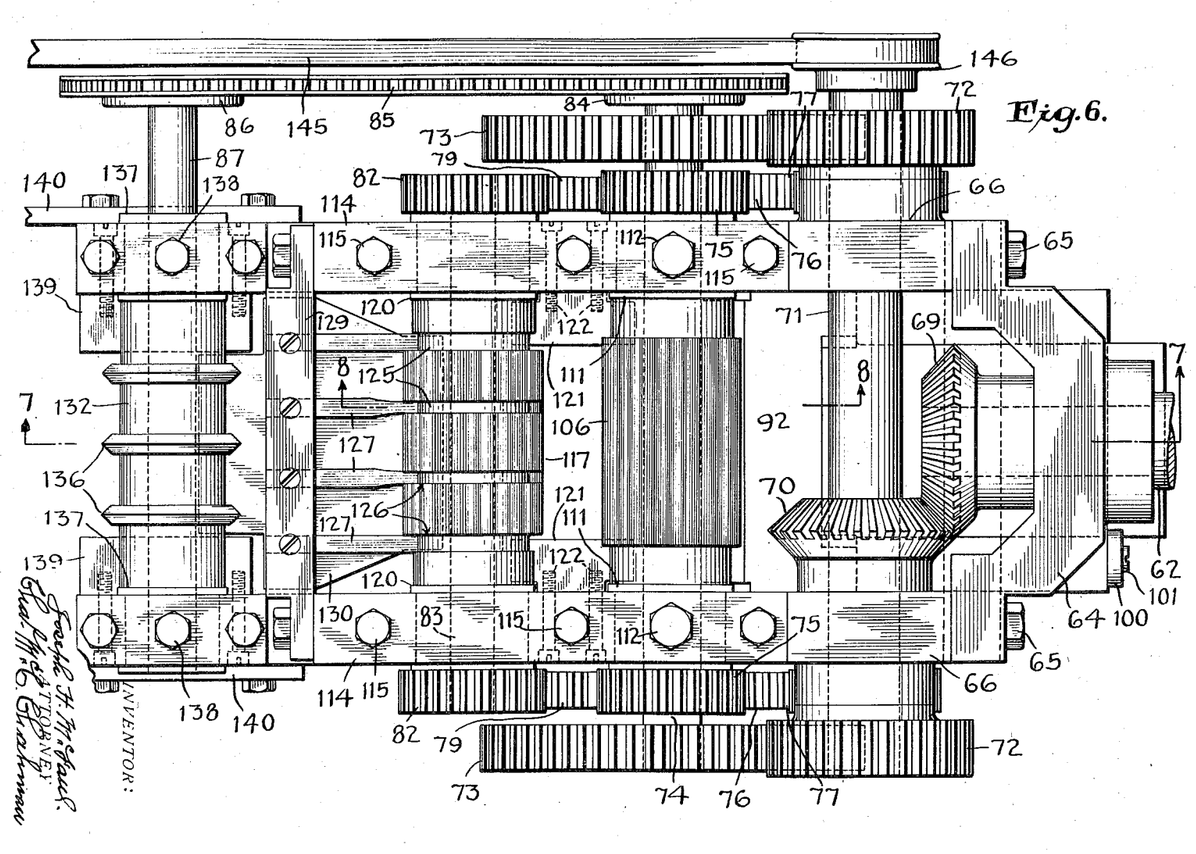
Figure 6 is a plan view enlarged of the corrugating means, shearing means, scoring means, and their driving connections.

The bevel gear 11 meshes a bevel gear 57 which is fast to a shaft 58, having its bearing in an extension 59 from the frame of the punch press. Secured to the other end of the shaft 58 is another bevel gear 60, which meshes a bevel gear 61 on a horizontal shaft 62. The horizontal shaft 62 is supported in a bearing carried on the main frame I of the machine, afforded by a bracket 64, which is bolted at 65 to the frame 66 which carries the corrugating, shearing and scoring means. This frame comprises two side members having flanges 67, bolted at 68 to the frame I, or a plate carried by said frame. The end of the shaft 62, adjacent the bracket 64, has pinned, or otherwise secured, to it a bevel gear 69 which engages a bevel gear 70, Figure 6, which is fast on a shaft 71 having its bearings in the side frames 66. The shaft 71 at its ends, outside of the frames 66, has spur gears 71, which, respectively mesh large gears 73, secured on the ends of a shaft 74. The shaft 74 is journaled in the side frames 66 and drives the corrugating means hereinafter described.

Figure 10:
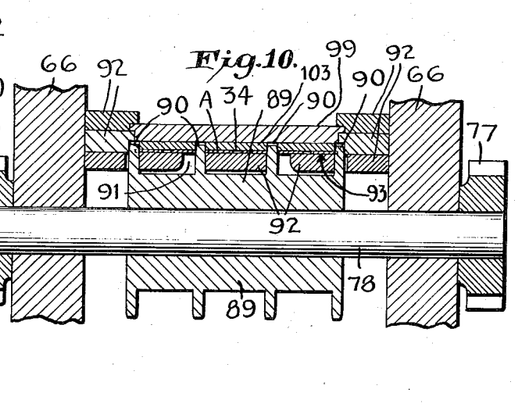
Figure 10 is a fragmentary sectional view through the pilot or feeding roller and is taken on line 10—10 of Figure 7, looking in the direction of the arrows.

The shaft 74 also carries spur gears 75, which mesh with idler gears 76 on shaft 76a, which in turn, respectively, engage gears 77, secured to a shaft 78, Figure 10, having its bearings in the side frames 66. The shaft 78 drives the strip guiding, or pilot, means presently described. The spur gears 75 also mesh other idler gears 79 on the shaft 79a, Figure 7, which drive the spur gears 80 mounted on the shaft 81. The spur gears 80 cooperate, respectively, with other spur gears 82 carried on the shaft 83. The shafts 81 and 83 form part of the shearing mechanism presently described. The shaft 74 extends beyond the gear 73 on one side of the frame, Figure 6, and has secured on its outer end a sprocket 84. A sprocket chain 85, engages the sprocket 84 and another sprocket 86 which is fast to a shaft 87. The shaft 87 drives the scoring means 56 presently described.

The means for feeding the strip to the corrugating rollers and guiding it prior to its introduction between the corrugating rollers will now be described. This means is an important part of the invention as it is necessary to form the corrugations in the strip in a fixed relation to the positions of the perforations 34. It is, therefore, essential to guide the strip accurately and prevent any possibility of side play of the strip, as it is being advanced, or any vertical movement which might cause buckling. The guiding perforations 13 are now utilized, in addition to the notches 15. As the movement of the strip through the punch press is intermittent and the movement of the strip through the corrugating, shearing and scoring means is continuous, it is desirable to form the loop A1, in the basic strip between the punching means and the corrugating means; and the amount of material in the loop may vary.

Figures 12, 13:
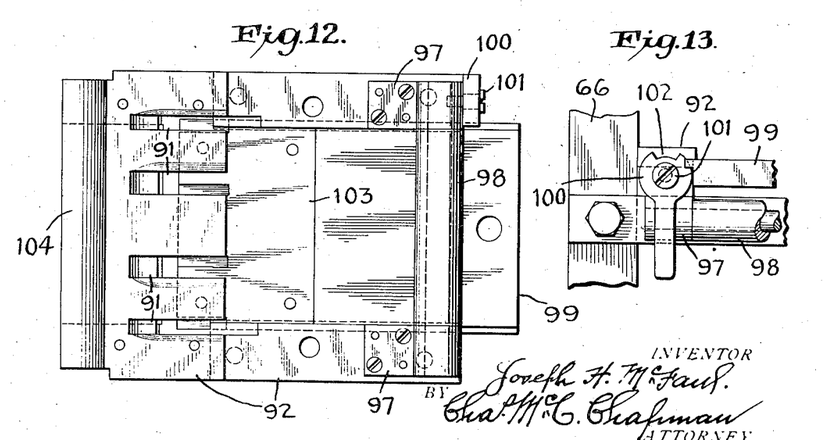
Figure 12 is a bottom plan view of the guiding member forming part of the means for feeding the strip to the corrugating rollers.
Figure 13 is a detail view of a locking means for retaining part of the guide member, shown in Figure 12, in position.
Figure 20:
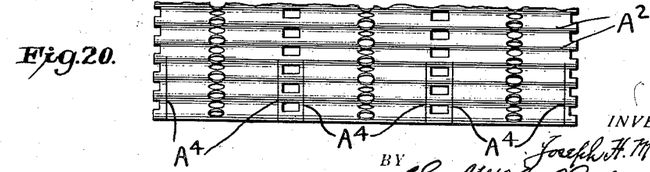
Figure 20 is a plan view of the basic strip after being corrugated and showing in a part of its length the lines on which it is sheared.

Keyed at 88 to the shaft 78 is the pilot roller 89, Figure 10. This pilot roller has four circumferential rows of teeth 90, which engage the guiding perforations 13 and side notches 15. These rows of teeth 90 pass through slots 91 in a composite guide member, the several parts of which are indicated at 92, which is shown in bottom plan in Figure 12, and in section in Figures 7, 8 and 9. The forward part of this guide member extends almost to the corrugating rollers and is grooved or slotted at 93, to provide an accurate guideway for the strip so as to prevent any lateral or vertical movement thereof. The guide member 92 is secured to a cross bar 94, Figure 8, by bolts 95, and said bar is secured to the side frames 66 by bolts 96. Mounted in brackets 97, secured to the rear part of the guide member, is a roller 98 over which the strip passes while entering the guide member, as shown in Figure 7. When the strip is being introduced by hand into the guide member it is desirable to remove its upper part 99 so that one may observe whether the teeth 90 are in proper engagement with the perforations 13 and notches 15. The part 99 is slidably mounted in the guide member and is held therein by a swinging latch 100, (Figure 13) pivoted at 101 to the stationary part of the guide member. The latch 100 has a notched part 102 which, when swung at approximately right angles to the position shown in Figure 13, will permit the part 99 to be withdrawn. After the strip has been properly started, the part 99 is replaced and locked. The part 99 is provided, on its under side, with a hardened steel plate 103. As the pilot roller is advancing the strip, the natural tendency is to force the strip upwardly. This pressure is exerted against the plate 103 and excessive wear on the part is thus prevented. The forward end of the guide member is slabbed off, as indicated at 104, so as to place the strip almost in the bite of the corrugating rollers 105 and 106. The guiding perforations 13 and the elliptical perforations 34 are spaced in a definite relation to each other and the pilot roller 89 is located the proper distance from the corrugating rollers 105 and 106, so that the strip will be fed accurately into the corrugating rollers and the position of the perforations 34 in relation to the corrugations will always be the same. Figure 20 is a plan view of a portion of the strip after it has been corrugated, the corrugations being designated A2. From this view and an inspection of Figure 18, it will be noted that the perforations 34 are at the concave and convex portions, or the hills and dales of the corrugations. The thin webs A3 between the perforations 34 occupy a position in approximately the horizontal center of the corrugated strip. This is the condition which it is desired to have prevail at all times during the operation of the machine.

The lower corrugating roller 105 is keyed at 107 to the shaft 74 which is continuously driven by the mechanism heretofore described. This shaft is mounted in bearing blocks 108, Figures 7 and 8, fitted into slots of the side frames 66. The upper corrugating roller 106 is keyed at 109 to a shaft 110 mounted in bearing blocks 111 similar to the bearing blocks 108. The upper corrugating roller 106 meshes the lower roller 105, and is not independently operated, it being preferable to not positively drive the upper roller, since any slight inaccuracies in the operation of the latter, due to wear, or other causes will better adjust themselves if the upper roller is not positively driven. Screw-bolts 112 engage the upper bearing blocks 111 to provide for a proper adjustment between the corrugating rollers. These bolts are provided with lock nuts 113 and have threaded engagement with cap bars 114 secured by bolts 115 to the tops of the side frames 66.

Figure 8:
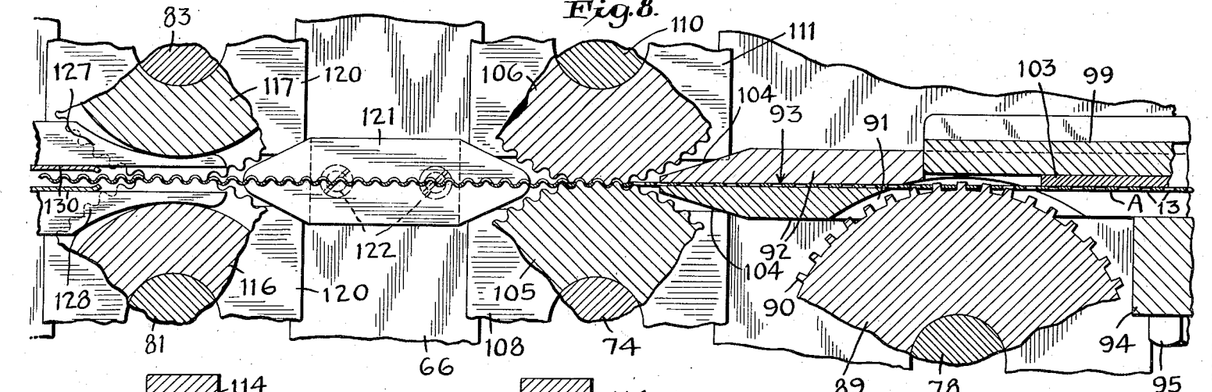
Figure 8 is a fragmentary sectional view, showing parts of the shearing rollers, corrugating rollers and pilot roller or feeding means, the section being taken in the line 8—8 of Figure 6, looking in the direction of the arrows.
Figure 9:
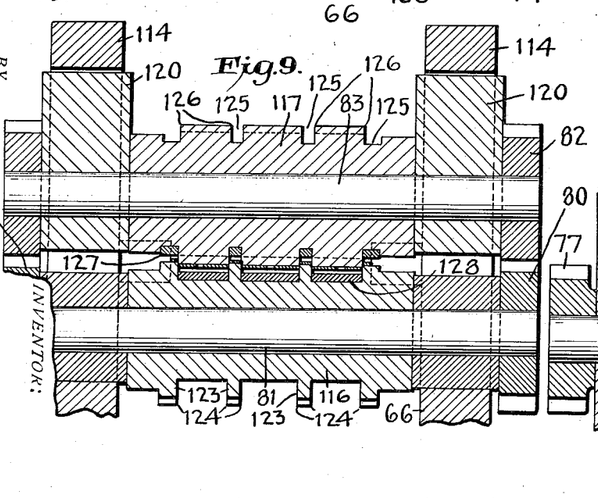
Figure 9 is a fragmentary sectional view through the shearing rollers and is taken on line 9—9 of Figure 7, looking in the direction of the arrows.

From the corrugating means the corrugated strip passes to the shearing means 55, which comprises a pair of rollers 116 and 117, see Figures 7, 8 and 9, keyed respectively, at 118 and 119 to the shafts 81 and 83. These shafts are mounted in bearing blocks 120, held in openings in the side frames 66. To insure an accurate entry of the corrugated strip between the shearing rollers, hardened steel plates 121 are secured, by screws 122, to the inner sides of the frames 66. These plates act as guides and accurately position, and prevent any possibility of lateral movement of, the passing corrugated strip. The lower shearing roller 116 has a series of circumferential flanges 123, which are finely ground to provide shearing edges 124. The upper shearing roller 117 has a corresponding series of circumferential grooves 125 which are also ground to provide shearing edges 126. As the corrugated strip is passing between the shearing rollers and the flanges 123 enter and cooperate with the grooves 125, the strip will be sheared along the lines indicated at A4 in Figure 20. It is important that the shearing rollers 116 and 117 be also corrugated; for, the shearing rollers, being positively driven, act to advance the sheet from the corrugating rollers. If the shearing rollers were not corrugated the strip would be more or less flattened or distorted and the results would be most unsatisfactory. It will be noted that the shearing acts to separate, or cut away, the parts of the strip containing the guiding perforations 13 and guiding notches 15, and in effect produces a plurality of strips which, in the present instance, have a row of the elliptical perforations 34, at or near their central portion. The guiding perforations 13 and notches 15 having served their purposes, the narrow strips containing the perforations and notches are eventually discarded as waste. The wider strips, having the elliptical perforations 34, after being scored, are separated into the individual nail-strips.

Due to the shearing rollers being corrugated, there will be a tendency, particularly on the part of the narrow waste strips, to follow or coil around the shearing rollers; and to prevent this, stripper fingers 127 and 128 are provided. The grooves in the rollers 116 and 117 are made deep enough to accommodate the fingers 127 and 128, respectively, which are secured by screws, or other means to the parallel cross-bars 129, extending between and secured to the side frames 66, Figures 6 and 7. The bars 129 also carry guide plates 130, which lead the useful strips to the scoring means now to be described.

The scoring means 56 comprise a pair of scoring and flattening rollers 131 and 132, keyed at 133 and 134, to the shafts 87 and 135 respectively. The lower scoring roller is positively driven by the sprocket mechanism heretofore described, while the upper scoring roller is driven by frictional contact with the strips passing between the two. The scoring rollers have a plurality of flanges which are provided with V-shaped scoring edges 136. The shafts 87 and 135 are carried in bearing blocks 137 mounted in slots of the side frames 66, or extensions therefrom. By means of screw bolts 138, accurate adjustments may be made in positioning the upper scoring roller, relatively to the lower roller, to compensate for wear, and to maintain the proper relation of the rollers for scoring and flattening the thin webs of material between perforations 34. Side guides 139 of hardened steel are also provided for the strips as they leave the scoring rollers. It is important also that the scoring rollers be so positioned as to score the material along the center lines of the rows of elliptical perforations; and attention is particularly directed to Figure 18, which illustrates the corrugated material and the scoring rollers on a large scale. By scoring the material between perforations centrally of the latter, the penetrating points of the nails are made uniform in length regardless of the dimensions of the nail-strips which may be made to vary as desired, and which, in the present instance of my invention, consist of four wide strips and two comparatively narrow strips. It will be noted that the scoring rollers not only score the material, but change the plane of the thin webs of material between perforations so as to bring them to a horizontal position in the center line of the perforations. The holes 34 being elliptical and numerous and there being only a very small amount of material between them after the scoring has taken place, and the strips have been separated, the individual nails thereafter formed are of a very high quality, the penetrating points being exceptionally long and very keen. These penetrating points can be varied in length by changing the length of the major diameter of the perforations 34 and 34a; and it is to be noted that my invention is not restricted in this particular to either the size or shape of said perforations.

*Separating and winding*

Figure 14:
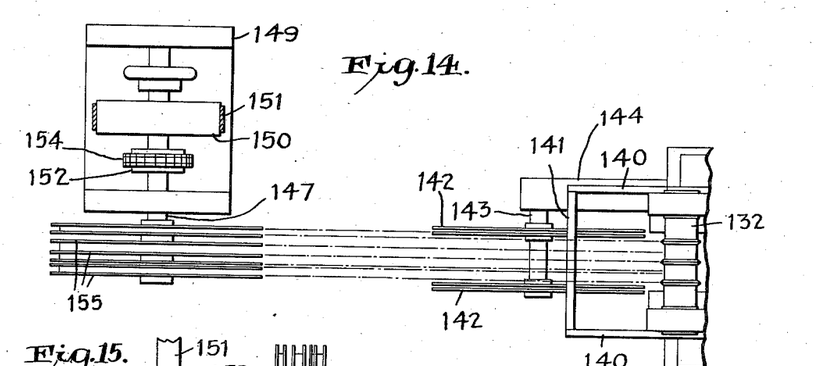
Figure 14 is a plan view showing the means for separating and taking up the individual nail-strips.

Mounted on arms 140, fastened to the opposite side frames 66, is a horizontal bar 141, in contact with which the various strips pass, see Figures 1 and 14, and the direction of travel of each strip is changed as it passes the bar. The useful strips, that have been scored, being weakened, are very easily separated in this manner. All the strips pass directly onto reels, the waste material being subsequently discarded; and as the reels of individual nail strips are completed they are boxed ready for shipment, the user cutting them into nails or fasteners of desired size.

Figure 11:
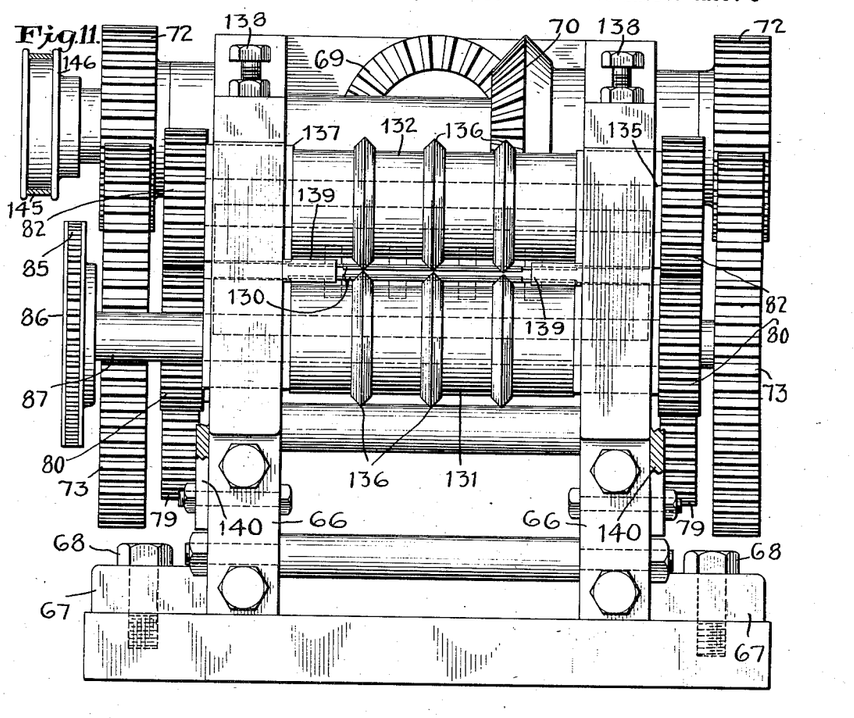
Figure 11 is a view in end elevation showing particularly the scoring rollers, and looking toward the right of Figure 7.
Figures 15, 16:
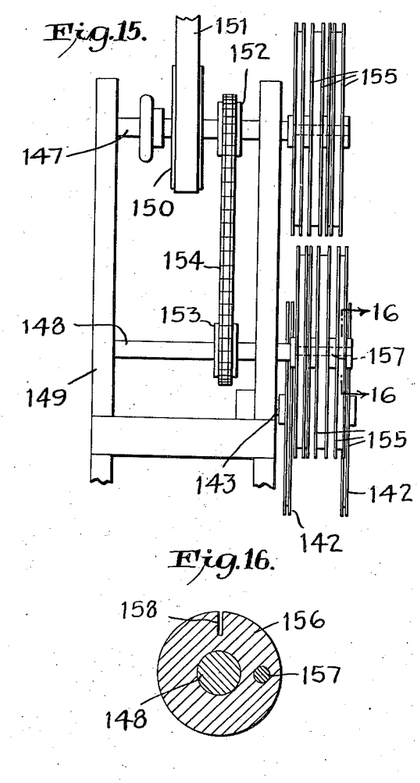
Figure 15 is an end view of the parts shown in Figure 14.
Figure 16 is a fragmentary detail sectional view taken on line 16—16 of Figure 15 and looking in the direction of the arrows.

The mode and means of separating the strips and winding them may be widely varied. As shown in Figure 1, the two outside waste strips pass over the bar 141 and are wound on reels 142. These reels are removably mounted on a shaft 143, carried in a bracket 144 secured to the machine frame 1. The shaft 143 is driven by a belt 145, Figures 1 and 11, which receives its power from a pulley 146 on the outer end of shaft 71. The reels for the individual nail-strips and the balance of the waste strips are mounted on shafts 147 and 148, Figures 1, 14 and 15, having suitable bearings in a frame 149. The shaft 147 is driven by a pulley 150 to which power is transmitted by a belt 151, running to some driven member of the machine proper. Sprockets 152 and 153 connected by a sprocket chain 154 drive the shaft 148. The reels comprise a series of removable annular drums 155 suitably spaced on the shafts 147 and 148. One of the cores 156 of the reels is shown in Figure 16, and is shown as held from rotating on the shaft by a rod or key 157, which extends parallel, and moves, with the shaft. In starting a reel one end of the strip is flattened and entered into the slot 158 in the core. This mode of disposing of the ten strips of material,—useful and waste,—is simple and convenient and has been found eminently successful; but, my invention is not to be restricted thereto, nor to the specific details of the various units employed, or shown in my drawings, for carrying out my invention in its broad ideas of means and functions.

The various units of mechanism which I have designated X, 2 and 3, in Figure 1, and 54, 55 and 56, in Figure 7, can be greatly modified within the scope of my invention, and I am not to be confined to the details shown; for, the reels at the opposite ends of the machine for delivering and taking up the strips acted upon and produced, can be materially changed without departing from the spirit of my invention. And I may change the character and form of the punch-press and its male and female members so as to produce other forms of perforations in the basic strip for both feeding and nail-point making purposes; or the basic-strip advancing means may be changed so as to produce the proper advancing movement of the strip according to changes in the punch-press; or the corrugating means may be changed so as to give the perforated strip different forms of corrugations in cross-section, thus changing the characteristics of the nails or fasteners; or the shearing and scoring can be accomplished simultaneously at the same point in the machine and by the same unit of mechanism, thus eliminating one operation and unit of mechanism, curtailing and simplifying the machine and reducing cost of production and maintenance. The sizes of the nail-strips can also be varied; that is to say, in the drawings, the nail-strips shown in Figures 18 to 20 will produce nails of approximately one-half inch and five-eighths inch in length, two of the former and four of the latter. This production can be greatly varied, by varying the width of the basic-strip, and the spacing of the punches, the shearing-blades and the scoring-blades.

Figure 18:
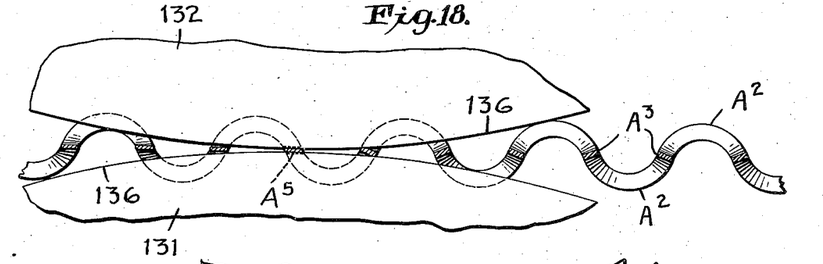
Figure 18 is an enlarged longitudinal sectional view showing the multiplex or basic strip and method of scoring it.

The details of my invention being clear from the foregoing, the following brief description of the mode of operation will be readily understood:

The product of my machine is shown in Figures 18 to 20, and consists of a strip of sheet-metal of indefinite length and predetermined width. The strip is first perforated or punched to produce the rectangular guiding apertures or slots 13 and 15. It is next punched to produce the widely-spaced elliptical apertures 34a, and is then punched to produce the intermediate elliptical apertures 34. The perforated strip is then corrugated transversely, or at a right angle to the lines of apertures. The corrugated strip is then sheared along the several lines A4, so as to divide the basic or perforated strip into the waste strips, containing the rectangular apertures or slots, and the useful or nail strips which are duplex in character and of which there are three provided with the elliptical apertures extending longitudinally thereof. Finally, the duplex nail-strips are divided longitudinally by scoring the same centrally of the elliptical apertures, the scoring, as shown in Figure 18, simultaneously pressing the thin webs between the apertures 34 into a horizontal plane passing midway between the hills and dales of the corrugations. The scoring leaves the said web, between apertures, so thin that the six nail strips are readily separated by the imposition of the slightest tension or stress upon the strips as they pass from the scoring rollers to the bar 141 as seen in Figure 1. Being thus separated the waste strips and the useful strips pass to the respective reels and are taken up for convenient disposition, the reels of waste strips being discarded and the reels of useful or nail strips being stored or commercially disposed of.

The foregoing sequence of operations is illustrated, more or less diagrammatically in Figure 1. Figures 2, 3, 4 and 5 show the punching mechanism and the initial advancing mechanism. The basic strip A is lubricated at 31, and variously punched at 14, 16, 32 and 33; and is initially advanced at 42—43, from which point it passes to the third unit (Fig. 1) or successive mechanisms 54, 55 and 56. Figures 6 to 13 show these successive mechanisms and, as the basic strip A leaves the unit 2, or punch press and advancing mechanism, it falls into a compensating loop A' and then its end is passed over the guide roller 98 into the guideway 93, the parts 99 having been previously removed so as to enable the operator to observe whether the feeding wheels 90 are properly engaged with the rectangular apertures in the basic strip. The wheels and apertures having been properly set for feeding the basic strip through the machine, the parts 99 are replaced and the machine is again set in operation. The guiding means 92 enable the leading end of the basic strip to advance almost to the bite of the corrugating rollers, where the transverse corrugations are produced. The perforated and corrugated strip then passes to the shearing unit at 55, where the waste strips are separated from the useful strips as shown in Figure 20, at A4. Then all the strips pass through the guiding means 130 to the scoring unit 56, where the useful strips are scored transversely of the thin webs between the elliptical apertures, and said thin webs are depressed into the horizontal plane extending longitudinally of the strips and midway of the hills and dales of the corrugations thereof, as shown in Figure 18. The waste strips and the useful strips are then passed into contact with the tension bar 141 which readily separates the individual nail-strips from each other, the waste strips being guided over the said tension bar and directed to their respective reels as shown in Figure 1 and 14 and 15. The individual nail-strips are directed alternately downwardly and upwardly to the respective sets of reels 155 as shown in Figures 1 and 14. This operation continues until the basic strip of indefinite length has become exhausted and passed entirely through the successive units to the take-up reels. As previously pointed out, the waste reels are discarded and the nail-strip reels are sold into use, the purchaser cutting the said strips transversely into any desired length, regardless of corrugations, to produce the nails or fasteners of the size required for his particular purposes.

The several reels for the separated strips of material, especially those for receiving the nail or useful strips, may be provided with a device which will compensate for the gradually increasing diameter of the strips wound thereon, a simple device being friction means between the reels and the driving shafts which will permit slippage, thus enabling the coils of nail-strips to be tightly wound throughout. Or, the shaft driving means may include frictional driving connections, permitting the same results.

Having thus described my invention what I claim and desire to secure by Letters Patent is:

1. An automatic nail-strip machine having in combination, means for perforating a flat strip of material, means for corrugating said perforated strip, and means for separating said nail-strip into a plurality of individual nail-strips.

2. A nail-strip fabricating machine having in combination a perforating unit, a corrugating unit, a shearing unit, means for taking up the strips produced, and means for actuating the several units and take-up means.

3. A nail-strip machine having in combination, means for fabricating a multiplex nail-strip from a continuous flat strip of material of predetermined width, means for perforating the flat strip along parallel lines, means for corrugating the strip transversely to the lines of perforations, and means for shearing the strip between rows of perforations to produce individual nail-strips.

4. A nail-strip machine having, in combination, means for fabricating a multiplex nail-strip, means for separating said multiplex nail-strip into a plurality of duplex nail-strips, and means for dividing said duplex nail-strips into a plurality of individual nail-strips.

5. A nail-strip machine having, in combination, a punch-press provided with several different kinds of punches; a strip advancing means carried by said punch-press; means for separating the strip into a plurality of nail-strips; and a take-up mechanism for the several nail-strips.

6. A nail-strip machine having, in combination, a punch-press having means for producing a plurality of rectangular guiding slots and means for producing a plurality of lines of apertures; a corrugating mechanism arranged to produce corrugations transversely of the strip and at an angle to the lines of apertures; shearing mechanism arranged to sever the strip between the lines of apertures; and means for taking up the strips.

7. A nail-strip machine having, in combination, a punch-press provided with punches for producing a plurality of feeding slots; and also provided with means for producing a plurality of lines of apertures arranged alternately with the lines of feeding slots; a corrugating mechanism arranged to produce corrugations transversely of the strip; shearing mechanism arranged to cut the strip into individual nail strips and cut out the several lines of feeding slots; and means for taking up the several nail strips.

8. A nail-strip machine having, in combination, a punch-press provided with punches for producing alternately a plurality of guiding slots and a plurality of elliptical apertures, and an initial advancing mechanism; corrugating mechanism arranged to corrugate the strip transversely; shearing mechanism having means for cutting the strip into a plurality of duplex nail-strips; scoring means for separating the duplex strips into individual nail-strips; and means for taking up the several strips produced.

9. A nail-strip machine having, in combination, means for fabricating a multiplex nail-strip, means for corrugating the strip, means for shearing the strip lengthwise, means for scoring certain of the sheared strips; means for placing the scored strips under flexing tension to part the same along the scored lines; and means for taking up the several strips thus produced.

10. A nail-strip machine having, in combination, means for forming a plurality of lines of perforation in a strip of flat material, means for corrugating said strip of material, means for shearing said corrugated strip adjacent some of said lines of perforations, means for scoring said nail-strip along other of said lines of perforations, and means for separating said nail-strip into a plurality of individual nail-strips.

11. A nail-strip machine having, in combination, means for forming a plurality of lines of rectangular perforations in a strip of flat material, means for forming a plurality of lines of elliptical perforation in said strip of material, means for cooperating with said lines of rectangular perforation for assisting in feeding said strip of material through said machine, means for corrugating said strip of material, means for shearing said nail-strip adjacent said lines of rectangular perforations, means for scoring said nail-strip along the lines of said elliptical perforations, and means for separating said nail-strip into a plurality of individual nail-strips.

12. A nail-strip machine having, in combination, means for forming a series of notches along the edges of a flat strip of material, means cooperating with said notches to advance said strip of material, means for forming said strip of material into a corrugated nail-strip, and means for separating said nail-strip into a plurality of individual nail-strips.

13. A nail-strip machine having, in combination, means for forming a series of notches along the edges of a flat strip of material, spring plungers engaging said notches to advance said strip of material, other spring pressed plungers engaging said notches to prevent any backward movement of said strip, means for corrugating said strip of material, and means for separating said corrugated strip into a plurality of nail-strips.

14. A nail-strip machine having, in combination, means for forming a plurality of lines of perforations in a strip of flat material, means for initially advancing said strip of perforated material, means for corrugating said perforated strip, means for feeding said strip of material to said corrugating means to insure the corrugations in said strip being positioned properly in relation to the perforations in said strip, and means for separating said sheet of material into a plurality of nail-strips.

15. A nail-strip machine, having, in combination, means for forming a plurality of lines of perforations in a strip of flat material, means for initially advancing said strip of perforated material, means for corrugating said perforated strip, a pair of corrugated shearing rollers adapted to shear said strip of material adjacent some of said lines of perforations, and means for separating said strip into a plurality of individual nail-strips.

16. A nail-strip machine having, in combination, means for forming a plurality of lines of perforations in a strip of flat material, means for initially advancing said strip of perforated material, means for corrugating said strip, means for shearing said strip adjacent some of said lines of perforations, means for scoring said strip along others of said lines of perforations, a tension member located beyond said scoring means, and a plurality of driven reels positioned at different levels in relation to said horizontal member, whereby said strip will be divided into a plurality of individual nail-strips as it passes onto said reels.

17. A nail-strip machine having, in combination, means for forming one or more lines of closely arranged perforations in a strip of flat material, means for advancing said strip of material through said machine; means for corrugating said strip, and means for parting said strip along the lines of said perforations to form a plurality of individual nail-strips.

18. A nail-strip machine having, in combination, means for forming one or more lines of elliptical perforations in a strip of flat material, means for advancing said strip of material through said machine, means for corrugating said strip, said perforations being closely adjacent to each other and the material left between said perforations lying in a plane substantially midway between the hills and dales of said corrugations, means for scoring said strip along the center line of said perforations, and means for parting said strip along said scored lines to form a plurality of individual nail-strips.

19. A nail-strip fabricating machine having, in combination, means for supporting a flat strip of material of indefinite length; means for punching the strip in predetermined manner; means for initially advancing the strip in and relatively to the punching means; strip guiding and feeding means for receiving the punched strip; means for corrugating the punched strip transversely of the latter; means for shearing the corrugated strip longitudinally of the latter; means for scoring the corrugated strip along certain of the punched lines; means for breaking apart the scored members of the strip; and means for taking up the several parts.

20. A nail-strip fabricating machine having, in combination, means for supporting a flat strip of material of indefinite length; means for punching the strip in predetermined manner along parallel lines; strip guiding and feeding means for receiving the punched strip; means for corrugating the punched strip transversely of the latter; means for shearing the corrugated strip into a plurality of duplex nail strips; means for dividing the duplex strips into individual nail-strips; and means for taking up the individual nail-strips.

21. A nail-strip machine having, in combination, means for forming a plurality of lines of rectangular perforations in a strip of flat material, means for forming a plurality of lines of elliptical perforations in said strip of material, means for cooperating with said lines of rectangular perforations for assisting in feeding said strip of material through said machine, means for forming said strip of material into a corrugated nail-strip, and means for separating said nail-strip into a plurality of individual nail-strips.

22. A nail-strip machine having, in combination, means for forming a series of notches along the edges of a flat strip of material, spring pressed plungers engaging said notches to advance said strip of material, slides carrying said spring pressed plungers, cams for advancing said slides, springs for retracting said slides, other spring pressed plungers mounted in a stationary part of said machine to prevent backward movement of said strip, and means for forming said strip of material into a corrugated nail-strip.

23. A nail-strip machine having, in combination, means for forming a plurality of lines of perforations in a strip of flat material, means for initially advancing said strip of perforated material, means for corrugating said perforated strip, means for shearing said strip adjacent some of said lines of perforations, a plurality of scoring members to score said strip along some of said lines of perforations, and means for separating said strip into a plurality of individual nail-strips.

24. A nail-strip machine having, in combination, means for forming one or more lines of closely arranged perforations in a strip of flat material, means for advancing said strip of material through said machine, means for corrugating said strip, means for scoring said strip along the lines of said perforations, and means for parting said strips along said scored lines to form a plurality of individual nail-strips.

25. A nail-strip machine having, in combination, means for forming a plurality of lines of guiding perforations in a flat strip of material, means for forming a plurality of notches along the edges of said strip, means for forming a plurality of lines of elliptical perforations in said strip, the long axes of which being transversely of said strip, and said lines of elliptical perforations being alternately disposed in relation to said lines of guiding perforations, means for corrugating said strip, means for shearing said strip to cut off said notches, means for shearing said strip adjacent said guiding perforations, means for scoring said strip along the lines of said elliptical perforations, and means for separating said strip into a plurality of individual nail-strips.

26. A nail-strip machine having, in combination, means for forming a plurality of lines of guiding perforations in a flat strip of material, means for forming a plurality of notches along the edges of said strip, means for forming a plurality of lines of elliptical perforations in said strip, the long axes of which being transversely of said strip, and said lines of elliptical perforations being alternately disposed in relation to said lines of guiding perforations, means cooperating with said notches to advance the strip while the perforations are being formed, means for corrugating said strip, means cooperating with said guiding perforations to advance said strip to said corrugating means, and means for separating said strip into a plurality of individual nail-strips.

JOSEPH H. McFAUL.